United States Patent [19]

Sugimoto et al.

[11] Patent Number: 4,620,772

[45] Date of Patent: Nov. 4, 1986

[54] LIQUID CRYSTAL DISPLAY PLASTIC CELL STRUCTURE

[75] Inventors: Toshihiko Sugimoto; Yozo Oishi; Suguru Yamamoto; Masaaki Kawaguchi, all of Osaka, Japan

[73] Assignee: Nitto Electric Industrial Co., Ltd., Osaka, Japan

[21] Appl. No.: 657,992

[22] Filed: Oct. 5, 1984

[30] Foreign Application Priority Data

Feb. 16, 1984 [JP] Japan ................................. 59-28358

[51] Int. Cl.⁴ ............................................. G02F 1/13
[52] U.S. Cl. ................................................... 350/337
[58] Field of Search ................................ 350/334, 337

[56] References Cited

U.S. PATENT DOCUMENTS 4,419,399 12/1983 Ichikawa et al. ................... 350/337
4,514,041 4/1985 Tanaka ................................ 350/337
4,533,214 8/1985 Penz et al. .......................... 350/334

FOREIGN PATENT DOCUMENTS 32101 4/1981 Japan ................................. 350/337

Primary Examiner—Donald Griffin
Attorney, Agent, or Firm—Sughrue, Mion, Zinn, Macpeak and Seas

[57] ABSTRACT

A liquid crystal display plastic cell structure free of deviation in position of electrode patterns comprising:

a cell substrate comprising a polarizing plate and an electrode pattern provided on the surface of the polarizing plate, said polarizing plate being produced by laminating a monoaxially stretched film on both surfaces of a polarizer in such a manner that the absorption axis of the polarizer is in parallel with the stretching axis of the monoaxially oriented films:

a cell substrate comprising a polarizing plate and an electrode pattern provided on the surface of the polarizing plate, said polarizing plate being produced by laminating a monoaxially stretched film on both surfaces of a polarizer in such a manner that the absorption axis of the polarizer is at right angles to the stretching axis of the monoaxially stretched films; and a liquid crystal sealed between the cell substrates, wherein the stretching axes of the monoaxially stretched films are in parallel with each other.

6 Claims, No Drawings

LIQUID CRYSTAL DISPLAY PLASTIC CELL STRUCTURE

FIELD OF THE INVENTION

The present invention relates to a liquid crystal display plastic cell structure. More particularly, the present invention is concerned with a liquid crystal display cell structure which prevents deviation in position of electrode patterns which causes in assembling cell substrates for production of a liquid crystal display cell, the cell substrate comprising a polarizing plate comprising a polarizer and a monoaxially stretched film provided on both surfaces of the polarizer, and an electrode pattern provided on the surface of the polarizing plate.

BACKGROUND OF THE INVENTION

In recent years a liquid crystal display device has been widely used in portable calculators, electronic watches, instruments, and so forth. With such a widespread use, the following have further been desired: a reduction in weight and thickness of devices, easy reading, low production costs, and so forth.

Under such circumstances, various attempts have been made to replace conventional liquid crystal display glass cells using a glass plate with plastic cells using a plastic film or sheet.

Such a plastic cell is fabricated by disposing a polarity of cell substrates comprising a polarizing plate which comprises a polarizer and a plastic film or sheet laminated on both surfaces of the polarizer, and an electrode pattern provided on the surface of the polarizing plate, in such a manner that the absorption axis directions of the polarizers are at right angles to each other and the electrode patterns are positioned exactly in a face-to-face relation, and then introducing a liquid crystal between the cell substrates.

It is required for the plastic films in contact with a liquid crystal to have chemical resistance (resistance to liquid crystals) and physical characteristics. Commercially available biaxially stretched films are not satisfactory in respect of optical characteristics although they satisfy the above requirements. On the other hand, unstretched films are satisfactory in optical characteristics but fail to meet the above requirements.

As a plastic film satisfying both the requirements, a monoaxially stretched film is now under investigation. Since, however, it is essential for plastic film to pass through drying and moisture-absorbing steps in the course of production of cell substrates, a satisfactory liquid crystal display plastic cell using such a monoaxially stretched film has not yet been developed.

A cell substrate is produced by the steps of laminating a monoaxially stretched film on both surfaces of a polarizer by bonding techniques such as use of an adhesive or melt adhesion to thereby produce a polarizing plate, and then providing an electrode pattern on the surface of the polarizing plate. During the process of forming such an electrode pattern on the polarizing plate, drying and moisture-absorbing treatments are applied, resulting in deformation of the cell substrate. For this reason, in a liquid crystal display plastic cell fabricated by assembling the cell substrates in such a manner that the absorption axes of the polarizers are at right angles to each other, the electrode patterns of the cell substrates are not positioned exactly in a face-to-face relation; i.e., they are deviated in position from each other, and a sharp display cannot be obtained.

In polarizing plates having the above-described structure, the moisture-absorbing expansion coefficient in a direction (A) in which the monoaxially stretched film is stretched is different from that in a direction (B) perpendicular to the direction (A). That is, the moisture-absorbing expansion coefficient in the direction (B) is greater than that in the direction (A). This means that the polarizing plate is anisotropic in the moisture-absorbing expansion coefficient.

It is essential for cell substrates constituting a liquid crystal display cell that the absorption axes of polarizers constituting the upper and lower cell substrates be at right angles to each other. When, therefore, a liquid crystal display cell is produced by assembling the cell substrates comprising a polarizing plate with an electrode pattern provided thereon, the polarizing plate being produced by laminating monoaxially stretched films on a polarizer in such a manner that the absorption axis of the polarizer is in a parallel relation with a stretching direction of the monoaxially stretched film, i.e., a direction in which the film is stretched, the stretching directions of the monoaxially stretched films constituting the upper and lower cell substrates are at right angles to each other.

In forming an electrode pattern on a polarizing plate, a transparent electrically conductive layer is formed on the surface of the polarizing plate by depositing a transparent thin layer-forming material such as indium oxide containing tin oxide or tin oxide containing antimony, by techniques such as vacuum deposition, sputtering or ion plating, a light-sensitive resin is coated on the transparent electrically conductive layer in a desired pattern, exposed to light, and then subjected to treatments such as chemical etching with acids or alkalis and rinsing to obtain the desired electrode pattern. Since, as described above, a polarizing plate is anisotripic in the moisture-absorbing expansion coefficient, a cell substrate passing through the steps of layer-deposition and moisturing (e.g., rinsing) is inevitably deformed. For this reason, if a liquid crystal display cell is assembled by disposing such deformed cell substrates in such a manner that the absorption axes of the polarizers are at right angles to each other, the electrode patterns of the upper and lower cell substrates are deviated from each other. Thus, a satisfactory display cannot be obtained.

SUMMARY OF THE INVENTION

As a result of extensive investigations to develop a method of preventing deviation in position of electrode patterns whereby the electrode patterns are positioned exactly in a face-to-face relation or even through they are deviated, it is only to an extent that cannot be appreciated apparently, it has been found that the object can be attained by changing the structure of polarizing plates constituting a liquid crystal display cell and also modifying the system of assembling the liquid crystal display cell.

Accordingly, an object of the present invention is to provide a liquid crystal display all plastic structure free of deviation in position of electrode patterns.

The liquid crystal display plastic cell structure according to the present invention comprises:

a cell substrate comprising a polarizing plate and an electrode pattern provided on the surface of the polarizing plate, the polarizing plate being produced by laminating a monoaxially stretched film on both surfaces of a polarizer in such a manner that the absorption axis of the polarizer is in parallel with the stretching axis of the monoaxially stretched films, a cell substrate comprising a polarizing plate and an electrode pattern provided on the surface of the polarizing plate, the polarizing plate being produced by laminating a monoaxially stretched film on both surfaces of a polarizer in such a manner that the absorption axis of the polarizer is at right angles to the stretching axis of the monoaxially oriented films, and a liquid crystal sealed between the cell substrates, wherein the stretching axes of the monoaxially stretched films are in parallel with each other.

In accordance with the structure of the present invention, the electrode patterns of the upper and lower cell substrates constituting the liquid crystal display cell can be positioned with no deviation or even if they are deviated from each other, it is only to an extent that cannot be appreciated apparently. Thus, a liquid crystal display plastic cell permitting good display can be obtained.

DETAILED DESCRIPTION OF THE INVENTION

Examples of polarizers which can be used in the present invention include iodine and/or dichroic dye-based polarizers prepared by adsorbing iodine and/or dichromatic dye onto a hydrophilic polymer film such as a polyvinyl alcohol film, a partially formalated polyvinyl alcohol film or a saponified film of ethylene-vinyl acetate copolymer and elongating the film; polyene-based polarizers prepared by film dehydrating a polyvinyl alcohol-based film to form a polymer and elongating the polyene films; and polyene-based polarizers prepared by dehydrochlorination of a polyvinyl chloride-based film to form a polyene film and elongating the film, and polarizers having a single plate parallel axis transmittance of from 10 to 50% and a single plate cross axis transmittance of from 0.1 to 25% are used.

The iodine-based, dye-based and polyene-based polarizers are disclosed in, for example, U.S. Pat. Nos. 2,237,567, 2,328,219 and 2,306,108, respectively.

Examples of monoaxially stretched films which can be used include films having an optical transparency such as a polyester film, a polycarbonate film, a polysulfone film, a polyether sulfon film and a polyamide film, which have been stretched by at least 30%, preferably from 50 to 800%, more preferably from 100 to 500% in a longitudinal or lateral direction. A monoaxially stretched polyester film is preferably used from a viewpoint of chemical resistance, for example. More preferred films are monoaxially stretched films in which, when heated at 150° C. for 30 minutes, the heat shrinkage coefficient is 3% or less preferably 1% or less, more preferably 0.5% or less in the stretching direction (MD), and 3% or less, preferably 1% or less, more preferably 0.5% or less in the direction perpendicular to the stretching direction (TD); the heat shrinkage coefficient ratio of the direction (TD) to the direction (MD) does not exceed 3.5 times, preferably 2.5 times; and the haze at a thickness of 100 μm is 10% or less, preferably 4.8% or less, more preferably 3% or less.

A curable resin layer such as a ultraviolet curable urethane acrylate layer may be formed on one surface of these films to prevent deterioration at the time of forming an electrode pattern.

Using the polarizer and monoaxially stretched film as described above, a polarizing plate is produced. In the present invention, two types of polarizing plates are produced.

One of the polarizing plates is produced by bonding a monoaxially stretched film on both surfaces of a polarizer by adhesion techniques such as use of a polyester-based adhesive in such a manner that the absorption axis of the polarizer is in parallel with the stretching axis of the monoaxially stretched film.

The other polarizing plate is produced by bonding a monoaxially stretched film on both surfaces of a polarizer by adhesion techniques such as use of a polyester-based adhesive as described above in such a manner that the absorption axis of the polarizer is at right angles to the stretching axis of the monoaxially stretched film.

On one surface of the thus-produced polarizing plate, a transparent thin film-forming electrically conductive material such as indium oxide containing tin oxide or tin oxide containing antimony is deposited by techniques such as vacuum deposition, sputtering or ion plating, thereby forming a transparent electrically conductive layer having a thickness of from 100 to 2,000 Å.

A light-sensitive resin is coated in a circuit pattern on the electrically conductive layer or on the whole surface of the electrically conductive layer, dried by heating, and then exposed to light. In the former case, the light-sensitive resin layer is exposed to light without a photomask, whereas in the latter case the layer is exposed to light through a photomask having the same pattern as above provided thereon. Thereafter, additional treatments such as chemical etching and washing with water are applied to obtain a cell substrate having the desired electrode pattern.

The thus-produced two cell substrates are assembled such that the electrode patterns of the substrates are positioned exactly in a face-to-face relation, and the periphery of the assemble is sealed. Simultaneously with this sealing, a liquid crystal is introduced between the cell substrates to obtain a liquid crystal display plastic cell. In assembling the cell substrates in accordance with the present invention, it is necessary that they be disposed in such a manner that the stretching axes of the monoaxially stretched films are in parallel with each other.

More preferably, a difference in moisture-absorbing expansion coefficient between the two cell substrates is from 0.00 to 0.15%, preferably from 0.00 to 0.01%, in the stretching axis of the monoaxially stretched film (MD), and 0.15% or less, preferably 0.05% or less, in a direction perpendicular to the stretching axis (TD).

The moisture-absorbing expansion coefficient as used herein is measured by conditioning a sample under conditions of temperature 40° C. and relatively humidity 92% for 24 hours and then drying it in vacuum (2 to 3 Torr) at 60° C. for 24 hours.

The present invention is described in greater detail by reference to the following example.

EXAMPLE

A 100 μm thick polyethylene terephtalate film stretched by 300% in a monoaxial direction was bonded to both surfaces of an iodine-based polarizer prepared by absorption and elongation of an iodine-based polarizing element in the conventional manner with a polyester-based adhesive in such a manner that the absorption axis of the polarizer was in parallel with the stretching axis of the film to produce a polarizing plate.

On one surface of the polarizing plate thus produced indium oxide containing tin oxide was deposited by a vacuum deposition method to form a 400 Å thick transparent electrically conductive layer. A light-sensitive resin was coated on the electrically conductive layer and then dried at about 60° to 80° C. A photomask with a desired pattern was placed on the above-formed resin layer. The resin layer was exposed to light through the photomask, etched, and then subjected to water washing and separation to produce a cell substrate (A) having the desired pattern electrode.

The same procedure as above was followed except that the polyester film was bonded in such a manner that the absorption axis of the polarizer was at right angle to the stretching axis of the film to produce a cell substrate (B).

The cell substrates (A) and (B) were combined together such that the electrode patterns were positioned exactly in a face-to-face relation and also the stretching axes of the polyester films of the cells (A) and (B) were in parallel with each other, with the cell substrates (A) and (B) as an upper plate and a lower plate, respectively, using a thermosetting sealing agent, to produce a liquid crystal display plastic cell.

The liquid crystal display plastic cell thus produced had almost no deviation in position of the electrode patterns and a satisfactory display was obtained.

A difference ($H_1$) in moisture-absorbing coefficient in the film stretching axis direction between the substrates (A) and (B) was 0.00%, and a difference ($H_2$) in moisture-absorbing coefficient in a direction perpendicular to the film stretching axis direction was 0.02%.

The same procedure as above was repeated except that the monoaxially stretched polyester film was replaced by various films such as a monoaxially stretched polycarbonate film (($H_1$): 0.00%; ($H_2$): 0.01%), a monoaxially stretched polyether sulfon film, and a monoaxially stretched polyamide film (stretching ratio: from 150 to 350% in any cases), or the iodine-based polarizer was replaced by a polyene-based polarizer prepared by dehydrochlorination of a polyvinyl chloride film. In any cases, a satisfactory liquid crystal display plastic cell was obtained in which the electrode patterns were positioned exactly in a face-to-face relation.

For comparison, a liquid crystal display cell was produced using only the substrate (A) or (B) in the conventional procedure. In any cases, the outlines of display areas were not sharp. ($H_1$) and ($H_2$) in the two substrates (A) were each 0.20%, and ($H_1$) and ($H_2$) in the two substrates (B) were each 0.18%.

Similarly, a liquid crystal display cell was produced using only a substrate (A') or (B') prepared using a monoaxially stretched polycarbonate film. In this cell, the outlines were not sharp. ($H_1$) and ($H_2$) in the two substrates (A') were each 0.18%, and ($H_1$) and ($H_2$) in the two substrates (B') were each 0.17%.

While the invention has been described in detail and with reference to specific embodiments thereof, it will be apparent to one skilled in the art that various changes and modifications can be made therein without departing from the spirit and scope thereof.

What is claimed is:

1. A liquid crystal display plastic cell structure free of deviation in position of electrode patterns comprising:
    a cell substrate comprising a polarizing plate and an electrode pattern provided on the surface of the polarizing plate, said polarizing plate being produced by laminating a monoaxially stretched film on both surfaces of a polarizer in such a manner that the absorption axis of the polarizer is in parallel with the stretching axis of the monoaxially oriented films;
    a cell substrate comprising a polarizing plate and an electrode pattern provided on the surface of the polarizing plate, said polarizing plate being produced by laminating a monoaxially stretched film on both surfaces of a polarizer in such a manner that the absorption axis of the polarizer is at right angles to the stretching axis of the monoaxially stretched films; and
    a liquid crystal sealed between the cell substrates, wherein the stretching axes of the monoaxially stretched films are in parallel with each other.

2. The liquid crystal display plastic cell structure as claimed in claim 1, wherein the monoaxially stretched film is a polyester film stretched by 50 to 800%.

3. The liquid crystal display plastic cell structure as claimed in claim 1, wherein the electrode pattern is provided by coating a light-sensitive resin on a transparent electrically conductive layer formed by a method selected from the group consisting of a vacuum deposition method, a sputtering method and an ion plating method, placing a photomask on the light-sensitive resin layer, exposing the light-sensitive resin layer through the photomask to light, and applying an etching treatment thereon.

4. The liquid crystal display plastic cell structure as claimed in claim 1, wherein a difference in moisture-absorbing expansion coefficient between the two cell substrates is from 0.00 to 0.15% in a stretching axis direction of the monoaxially stretched film, and 0.15% or less in a direction perpendicular to the above stretching axis direction.

5. The liquid crystal display plastic cell structure as claimed in claim 1, wherein the heat shrinkage coefficient of the monoaxially stretched film when heated at 150° C. for 30 minutes is 3% or less in a stretching direction (MD) and 3% or less in a direction (TD) perpendicular to the stretching direction, provided that the heat shrinkage coefficient ratio of the direction (TD) to the direction (MD) is 3.5 times or less.

6. The liquid crystal display plastic cell structure as claimed in claim 1, wherein the monoaxially stretched film has a haze of 10% or less at a thickness of 100 μm.

* * * * *